US008661017B2

(12) United States Patent
Wang et al.

(10) Patent No.: US 8,661,017 B2
(45) Date of Patent: Feb. 25, 2014

(54) METHOD AND APPARATUS FOR GENERATING MERGED MEDIA PROGRAM METADATA

(75) Inventors: Zhibing Wang, Beijing (CN); Yizhe Tang, Beijing (CN); Qian Chang, Beijing (CN); Ting-hao Yang, Beijing (CN)

(73) Assignee: Hulu, LLC, Santa Monica, CA (US)

( * ) Notice: Subject to any disclaimer, the term of this patent is extended or adjusted under 35 U.S.C. 154(b) by 0 days.

(21) Appl. No.: 13/408,969

(22) Filed: Feb. 29, 2012

(65) Prior Publication Data

US 2012/0209827 A1 Aug. 16, 2012

Related U.S. Application Data

(63) Continuation of application No. 12/347,419, filed on Dec. 31, 2008, now Pat. No. 8,185,513.

(51) Int. Cl.
*G06F 17/30* (2006.01)

(52) U.S. Cl.
USPC .......... 707/708; 707/718; 707/728; 707/731; 707/738

(58) Field of Classification Search
USPC .................. 707/7, 708, 728, 731, 738, 717
See application file for complete search history.

(56) References Cited

U.S. PATENT DOCUMENTS

| 5,832,494 A | 11/1998 | Egger et al. |
| 5,889,506 A | 3/1999 | Lopresti et al. |
| 6,199,082 B1 | 3/2001 | Ferrel et al. |
| 6,725,275 B2 | 4/2004 | Eyal |
| 2003/0028896 A1 * | 2/2003 | Swart et al. .................. 725/127 |
| 2003/0149975 A1 | 8/2003 | Eldering et al. |
| 2003/0163823 A1 | 8/2003 | Logan et al. |
| 2004/0255336 A1 | 12/2004 | Logan et al. |
| 2004/0268386 A1 | 12/2004 | Logan et al. |

(Continued)

FOREIGN PATENT DOCUMENTS

| EP | 1197020 B1 | 11/2007 |
| GB | 2323489 A | 9/1998 |

(Continued)

OTHER PUBLICATIONS

Press release—Gotuit.com: Video Unleashed, Gotuit Publishes White Paper: "The Currency of Internet Video", Oct. 28, 2008, http://www.gotuit.com/press/2008/1028_Whitepaper_CurrencyOfInternetVideo.html, 1 page.

(Continued)

*Primary Examiner* — John Breene
*Assistant Examiner* — Dennis Myint
(74) *Attorney, Agent, or Firm* — Fountainhead Law Group P.C.

(57) ABSTRACT

A method, apparatus, article of manufacture for generating a media program database having a plurality of media programs is disclosed. In one embodiment, the method is comprises the steps of receiving first media program metadata from a first source, searching the Internet to find second media program metadata from a second source distinct from the first source, determining if the first media program metadata and the second media program metadata are associated with the same media program, merging the first media program metadata and the second media program metadata if the first media program metadata and the second media program metadata are associated with the same media program, and storing the merged first media program metadata and second media program metadata in the media program database.

33 Claims, 7 Drawing Sheets

(56) References Cited

U.S. PATENT DOCUMENTS

| | | |
|---|---|---|
| 2005/0005308 A1 | 1/2005 | Logan et al. |
| 2005/0182792 A1* | 8/2005 | Israel et al. ............... 707/104.1 |
| 2005/0193014 A1* | 9/2005 | Prince ..................... 707/104.1 |
| 2006/0015925 A1 | 1/2006 | Logan |
| 2006/0161531 A1* | 7/2006 | Khandelwal et al. ............. 707/3 |
| 2007/0019095 A1* | 1/2007 | Ikehata et al. ........... 348/333.01 |
| 2008/0060001 A1 | 3/2008 | Logan et al. |
| 2008/0222063 A1* | 9/2008 | Krishnaprasad et al. ....... 706/15 |
| 2009/0216737 A1 | 8/2009 | Dexter |

FOREIGN PATENT DOCUMENTS

| | | |
|---|---|---|
| GB | 2443959 A | 5/2008 |
| WO | 0058940 A2 | 10/2000 |
| WO | 2005001656 A2 | 1/2005 |
| WO | 2005003899 A2 | 1/2005 |
| WO | 2007030621 A1 | 3/2007 |
| WO | 2007030751 A2 | 3/2007 |
| WO | 2007130472 A2 | 11/2007 |
| WO | 2008011091 A1 | 1/2008 |

OTHER PUBLICATIONS

Press release—Gotuit.com: Video Unleashed, Gotuit Announces Integration with DoubleClick, Oct. 22, 2008, http://www.gotuit.com/press/2008/1022_DoubleClick.html, 1 page.

Press release—Gotuit.com: Video Unleashed, Gotuit and Pixsy Rise the Bar on Video Search, Sep. 30, 2008, http://www.gotuit.com/press/2008/0930_Pixsy.html, 3 pages.

White Paper—"The Currency of Internet Video—The Importance of Quality Metadata in Monetizing Internet Video", Gotuit Media Corporation, Oct. 28, 2008, 13 pages.

U.S. Appl. No. 12/347,419, filed Dec. 31, 2008, entitled Method and Apparatus for Generating Merged Media Program Metadata.

* cited by examiner

METHOD AND APPARATUS FOR GENERATING MERGED MEDIA PROGRAM METADATA

CROSS-REFERENCES TO RELATED APPLICATIONS

This application is a continuation of U.S. patent application Ser. No. 12/347,419, filed Dec. 31, 2008, which is incorporated by reference in its entirety.

BACKGROUND OF THE INVENTION

1. Field of the Invention

The present invention relates to systems and methods for obtaining and using metadata, and in particular to a system and method for merging and using metadata regarding media programs from different sources.

2. Description of the Related Art

The dissemination and playback of media programs has undergone substantial changes in the past decade. Previously, media programs were disseminated either by analog broadcast (conventional, satellite, or cable) or by dissemination of films to movie theaters.

These traditional dissemination and playback means remain in use after the advent of digital technology. However, digital technologies have had a profound effect on the dissemination and playback of media programs.

First, digital technology permitted the use of digital video recorders (DVRs). DVRs, while similar in function to standard analog video cassette recorders (VCRs), provide a number of additional useful functions including live pause, the ability to record one program while playing back another, and the integration of the electronic program guides with DVR functionality (so that the recordation of media programs could be scheduled far in advance).

Second, technology also permitted the dissemination and playback of media programs via the Internet, and with improved signal processing and more and more households with high-speed Internet access (e.g. DSL, fiber, satellite), this method of dissemination and playback has become competitive with traditional means. Dissemination of media programs via the Internet may occur either by simple downloading, progressive downloading or streaming.

For progressive download, a media file having the media program is downloaded via the Internet using dial-up, DSL, ADSL, cable, T1, or other high speed internet connections. Simple downloading downloads the bytes of the media file in any convenient order, while progressive download downloads bytes at the beginning of a file and continues downloading the file sequentially until the last byte. At any particular time during progressive downloading, portions of the file are not immediately available for playback. In some situations, the entire file must be downloaded first before a media player can start playback. In other situations, media players are able to start playback once enough of the beginning of the file has downloaded, however, the media player must download enough information to support some form of playback before playback can occur. Playback is often delayed by slow Internet connections and are also often choppy and contains a high likelihood of stopping after only a few seconds. Downloaded material is thereafter stored on the end-user computer.

Streaming delivers media content continuously to a media player and media playback occurs simultaneously. The end-user is capable of playing the media immediately upon delivery by the content provider. Traditional streaming techniques originated from a single provider delivering a stream of data to a set of end-users. High bandwidths and CPU power are required to deliver a single stream to a large audience, and the required bandwidth of the provider increases as the number of end-users increases.

Unlike progressive downloading, streaming media is delivered on demand or live. Wherein progressive download requires downloading the entire file or downloading enough of the entire file to start playback at the beginning, streaming enables immediate playback at any point within the file. End-users may skip through the media file to start playback or change playback to any point in the media file. Hence, the end-user does not need to wait for the file to progressively download. Typically, media is typically delivered from a few dedicated servers having high bandwidth capabilities.

On-demand streaming media services allow a broad spectrum of media programs to be made available to the user for immediate viewing. One of the challenges in providing on-demand streaming media services is to provide the user with an interface that allows the user to efficiently select which media program they would like to view. In the golden era of broadcast television, a small number of channels were available, and it was a simple matter for the user to simply check each channel or refer to a printed guide. The advent of satellite or cable television multiplied the number of such channels, and provided program guides similar to the printed schedules. However, the number of channels was still relatively limited. The storage capacity of DVRs is such that simple hierarchical menu interfaces permit the user to easily and quickly gain access to recorded programs.

One way to provide the user with information about available media programs is to use metadata. Such metadata may include factors such as the source of the media program, actors, genre (drama, comedy), target age group, and/or one or more thumbnails (small still video frames of the media program) of the media program. The non-visual metadata can then be used to assist the user in searching for the media program of interest or to assist the media program disseminator to organize the media programs in a way that conveniently allows the user to find the media program of interest.

However, it is common for media programs to be associated with incomplete or inaccurate metadata. One reason for this is that many media providers only provide sufficient metadata to distinguish the media program from other media programs available from the media program provider, and not enough information to distinguish or identify the media program from other media programs available from all media program providers. For example a particular media program's metadata (whether the metadata is obtained from the same source as the media program itself or not) may only list a subset of the performers in the media program. The media program may also fail to include important metadata such as the episode number. Another problem is that metadata from different sources can be conflicting or at least not precisely the same. For example, metadata from one source may list an actor as "Will Smith," while another lists the actor as "Willard Smith"

What is needed is a method and apparatus that merges and integrates media program metadata from different sources, thus generating a complete metadata library that can be used to satisfy a broad range of media program search requests. The present invention satisfies that need.

SUMMARY OF THE INVENTION

To address the requirements described above, the present invention discloses a method, apparatus and article of manufacture for generating a media program database having a plurality of media programs. In one embodiment, the method is comprises the steps of receiving first media program metadata from a first source, searching the Internet to find second media program metadata from a second source distinct from the first source, determining if the first media program metadata and the second media program metadata are associated with the same media program, merging the first media program metadata and the second media program metadata if the first media program metadata and the second media program metadata are associated with the same media program, and storing the merged first media program metadata and second media program metadata in the media program database.

In another embodiment, the apparatus comprises a media program provider server for receiving first media program metadata from a first source comprises a media program provider video server, for searching the Internet to find second media program metadata from a second source distinct from the first source, for determining if the first media program metadata and the second media program metadata are associated with the same media program, for merging the first media program metadata and the second media program metadata if the first media program metadata and the second media program metadata are associated with the same media program comprises a media program provider server; and a media program provider database for storing the merged first media program metadata and second media program metadata.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
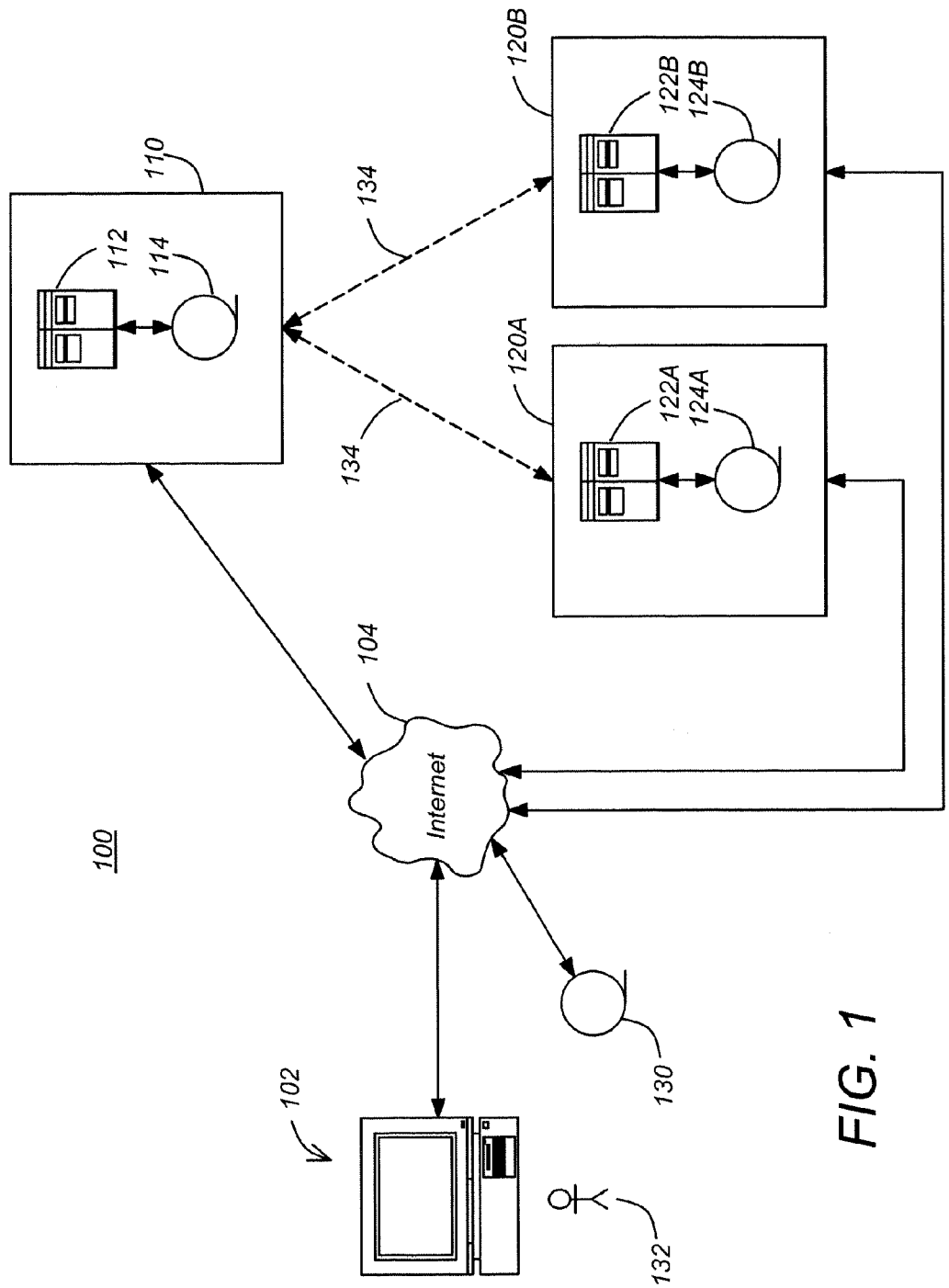
FIG. 1 is a diagram illustrating an exemplary media program system.

FIG. 1 is a diagram illustrating an exemplary media program system 100. In the illustrated embodiment, the system 100 comprises a one or more media program sources 120A, 120B, communicatively coupled to a communication network 104 such as the Internet and each having one or more source video servers 122A, 122B communicatively coupled to one or more source media program databases 124A, 124B.

The media program system 100 further comprises and a media program provider 110, communicatively coupled to the communication network 104, and having one or more media program provider video servers 112 and a provider media program database 114. In one embodiment, the media program provider 110 is a video-on-demand media program provider.

Typically, the media program provider 110 provides media programs and metadata to end customers, without obtaining metadata from external providers such as media program sources 120 or independent media program metadata sources 130. Examples of a media program provider 100 include www.fox.com, while media program sources 120 or independent media program source 130 may include www.imdb.com or www.tv.com. However, the media program provider 110 obtains media programs and metadata describing the media programs from the media program sources 120. Further metadata regarding the media programs available from either media program source 120 may also be available from an independent media program metadata source 130. Such information may be obtained via the communication network 104 or through auxiliary (and/or dedicated) communication links 134.

Using a computer system 102, remote users 132 can communicate with the media program provider 110, to obtain media programs (including video-on-demand services) and to search the provider media program database 114 to find media programs of interest.

Figure 2:
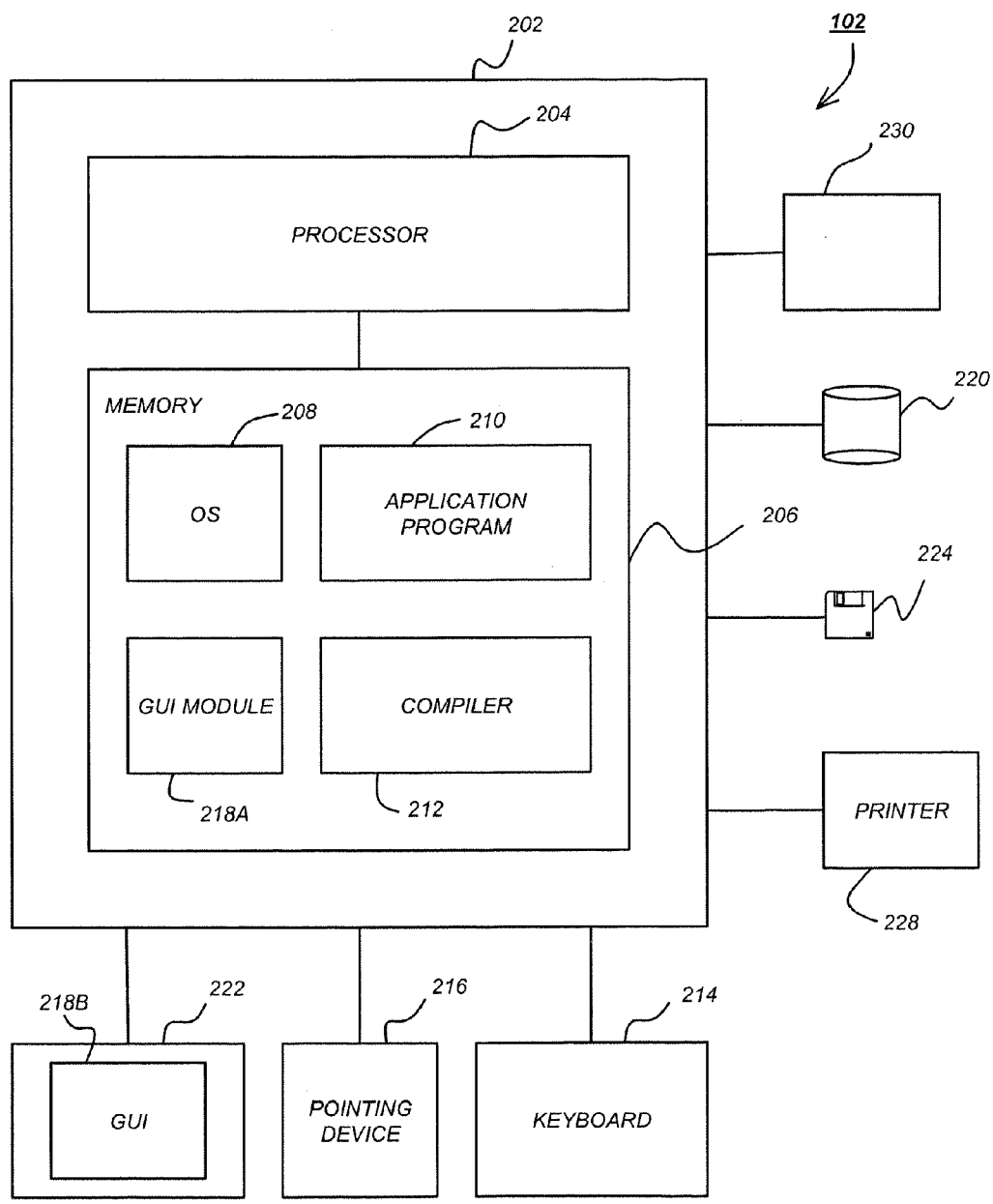
FIG. 2 illustrates an exemplary computer system 102 that could be used to implement the present invention.

FIG. 2 illustrates an exemplary computer system 102 that could be used to implement the present invention. The computer 202 comprises a processor 204 and a memory, such as random access memory (RAM) 206. The computer 202 is operatively coupled to a display 222, which presents images such as windows to the user on a graphical user interface 218B. The computer 202 may be coupled to other devices, such as a keyboard 214, a mouse device 216, a printer, etc. Of course, those skilled in the art will recognize that any combination of the above components, or any number of different components, peripherals, and other devices, may be used with the computer 202.

Generally, the computer 202 operates under control of an operating system 208 stored in the memory 206, and interfaces with the user to accept inputs and commands and to present results through a graphical user interface (GUI) module 218A. Although the GUI module 218A is depicted as a separate module, the instructions performing the GUI functions can be resident or distributed in the operating system 208, the computer program 210, or implemented with special purpose memory and processors. The computer 202 also implements a compiler 212 which allows an application program 210 written in a programming language such as COBOL, C++, FORTRAN, or other language to be translated into processor 204 readable code. After completion, the application 210 accesses and manipulates data stored in the memory 206 of the computer 202 using the relationships and logic that was generated using the compiler 212. The computer 202 also optionally comprises an external communication device such as a modem, satellite link, Ethernet card, or other device for communicating with other computers.

In one embodiment, instructions implementing the operating system 208, the computer program 210, and the compiler 212 are tangibly embodied in a computer-readable medium, e.g., data storage device 220, which could include one or more fixed or removable data storage devices, such as a zip drive, floppy disc drive 224, hard drive, CD-ROM drive, tape drive, etc. Further, the operating system 208 and the computer program 210 are comprised of instructions which, when read and executed by the computer 202, causes the computer 202 to perform the steps necessary to implement and/or use the present invention. Computer program 210 and/or operating instructions may also be tangibly embodied in memory 206 and/or data communications devices 230, thereby making a computer program product or article of manufacture according to the invention. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Figure 3:
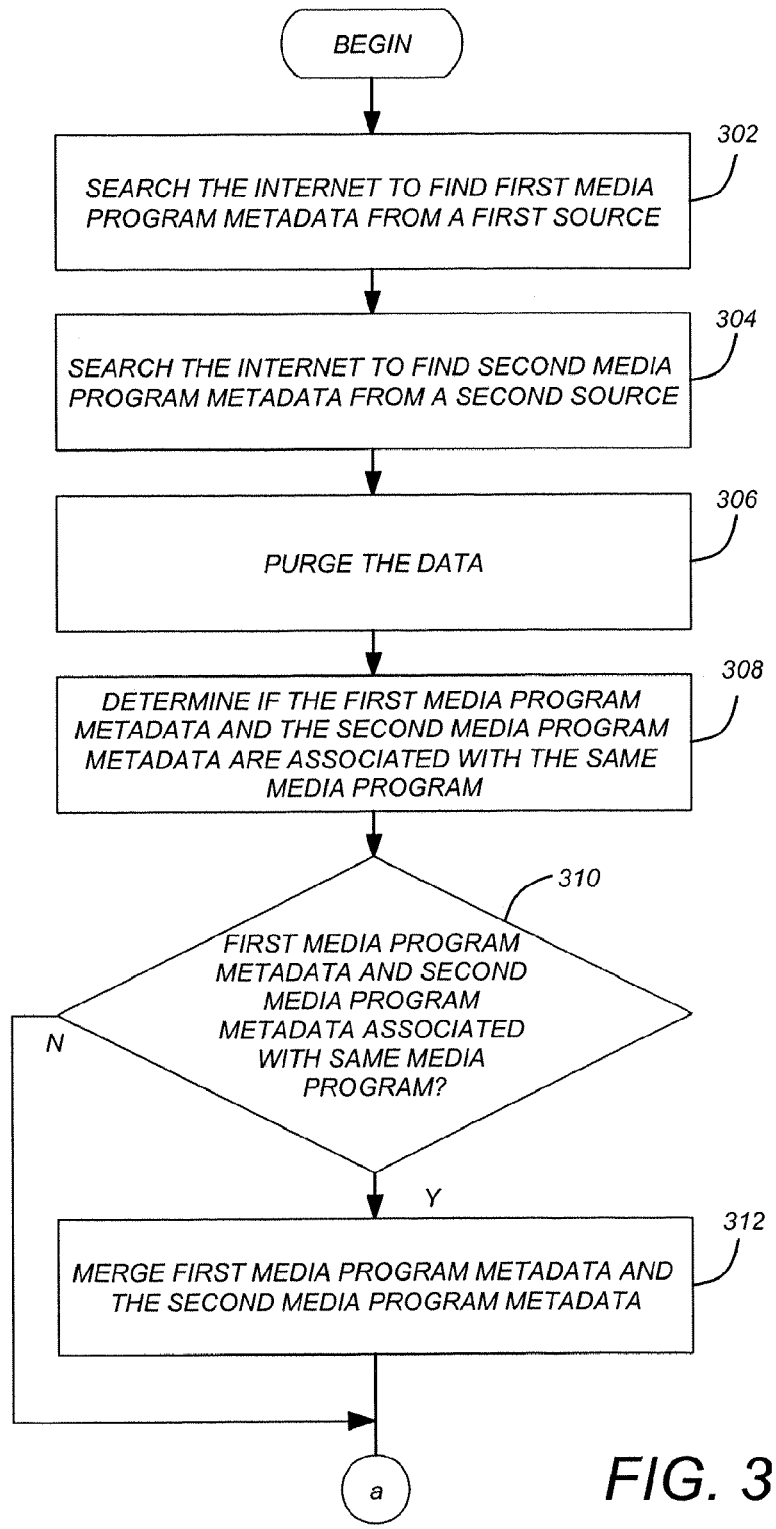
FIG. 3 is a diagram illustrating exemplary process steps that can be used to practice one embodiment of the present invention.

FIG. 3 is a diagram illustrating exemplary process steps that can be used to practice one embodiment of the present invention. A search is performed to find first media program metadata from a first source, as shown in block 302.

Figure 4A:
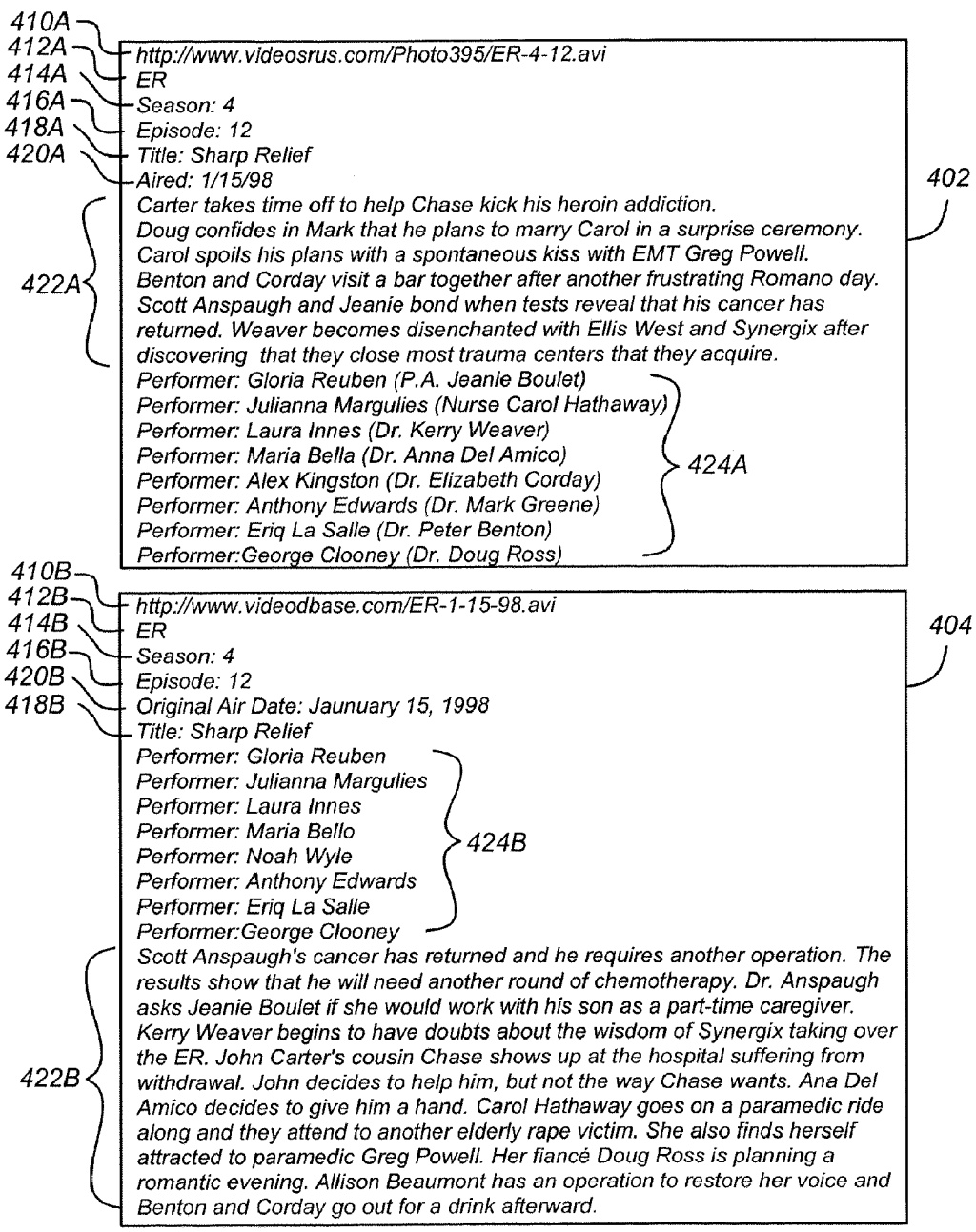
FIG. 4A is a diagram illustrating an exemplary embodiment of first media program metadata and second media program metadata.

FIG. 4A is a diagram illustrating an exemplary embodiment of first media program metadata 402 and second media program metadata 404. Note that the first media program metadata 402 and the second media program metadata 404 includes a URL for the media program 410A and 410B, a show name 412A and 412B, a season number 414A and 414B, an episode number 416A and 416B, an episode title 418A and 418B, an air date 420A and 420B, a synopsis 422A and 422B, and a performer list 424A and 424B, respectively. Note also that while the first media program metadata and the second media program metadata both refer to the same program, the different information is provided. The first and second media program metadata 402 and 404 refer to different URLs 410, and the original air data 420A and 420B is provided in a different order and in a different format. Also note that different performers are listed, and that only one of the metadata also indicates what character is played by each performer, and that each synopsis 422A and 422B is different.

The first media program metadata 402 that is found as the outcome of this search is received and temporarily stored. In one embodiment, the search is performed on the Internet, and the first source is media program provider 120A (which also provides the media program). In one embodiment, this search is performed by webcrawling either plurality of domain names on the Internet or by webcrawling a specific domain name known to have media programs. "Webcrawling" refers to a process by which an automated script or program browses the World Wide Web (or the Internet) in a methodical, automated manner. Webcrawlers can be used to harvest information or to perform maintenance tasks on a website. Generally, webcrawlers start with a list of uniform resource locators (URLs) to visit. The webcrawler identifies all of the hyperlinks reachable from the URLs and adds them to the list of URLs to visit, called the crawl frontier. URLs from the crawl frontier are visited according to a set of policies. Further information regarding webcrawlers is available from Wikipedia at http://en.wikipedia.org/wiki/Web_crawler, which is hereby incorporated by reference herein.

The first media program metadata 402 can be provided by itself, or may be provided along or in conjunction with the media program that the first media program metadata describes. As described above, the first media program metadata 402 may be incomplete or has errors.

In block 304, another search is preformed to find second media program metadata 404 from a second source 120B distinct from the first source 120A. The first and second sources may be regarded as "distinct" if they have different domain names (e.g. www.abc.com instead of www.def.com), or if they are different economic entities (neither the first source nor the second source owns or controls the other, nor are both sources owned by another entity).

Again, this metadata 404 is received and temporarily stored for further analysis as described below. In one embodiment, the second source is another media program provider 120B, but the second source (as well as the first source) may be the independent media program metadata source 130. Again, the search may be provided via the Internet, and may be the result of one or more webcrawling operations.

In block 306, the first media program data and the second media program data is purged. The purging operation decodes the stored first media program metadata and the second media program metadata. This process identifies the metadata into categories. For example, the first media program metadata 402 in FIG. 4A uses the term "aired" to refer to the "air date," while the second media program metadata uses the term "original air date." Both categories are recognized decoded so it is understood that both data items refer to the same category of metadata. The purging operation also normalizes the titles. Normalizing the titles includes standardizing the title for each media program so that they may be more easily compared. For example, this process would convert "M*A*S*H" to "MASH" and "Doogie Houser, M.D." to "Doogie Houser MD." The purging operation also identifies episode number (s), season number(s), keywords (such as those in the synopsis), and any other media program metadata of use.

In block 308, a determination is made as to whether the retrieved first media program metadata is associated with the retrieved second media program metadata are associated with the same media program. If the retrieved first media program metadata is associated with the retrieved second media program metadata are associated with the same media program, the first media program metadata and the second media program metadata are merged, as shown in block 312. If they are not associated with the same media program, the operations of block 312 are bypassed, as shown in block 310.

Figure 5:
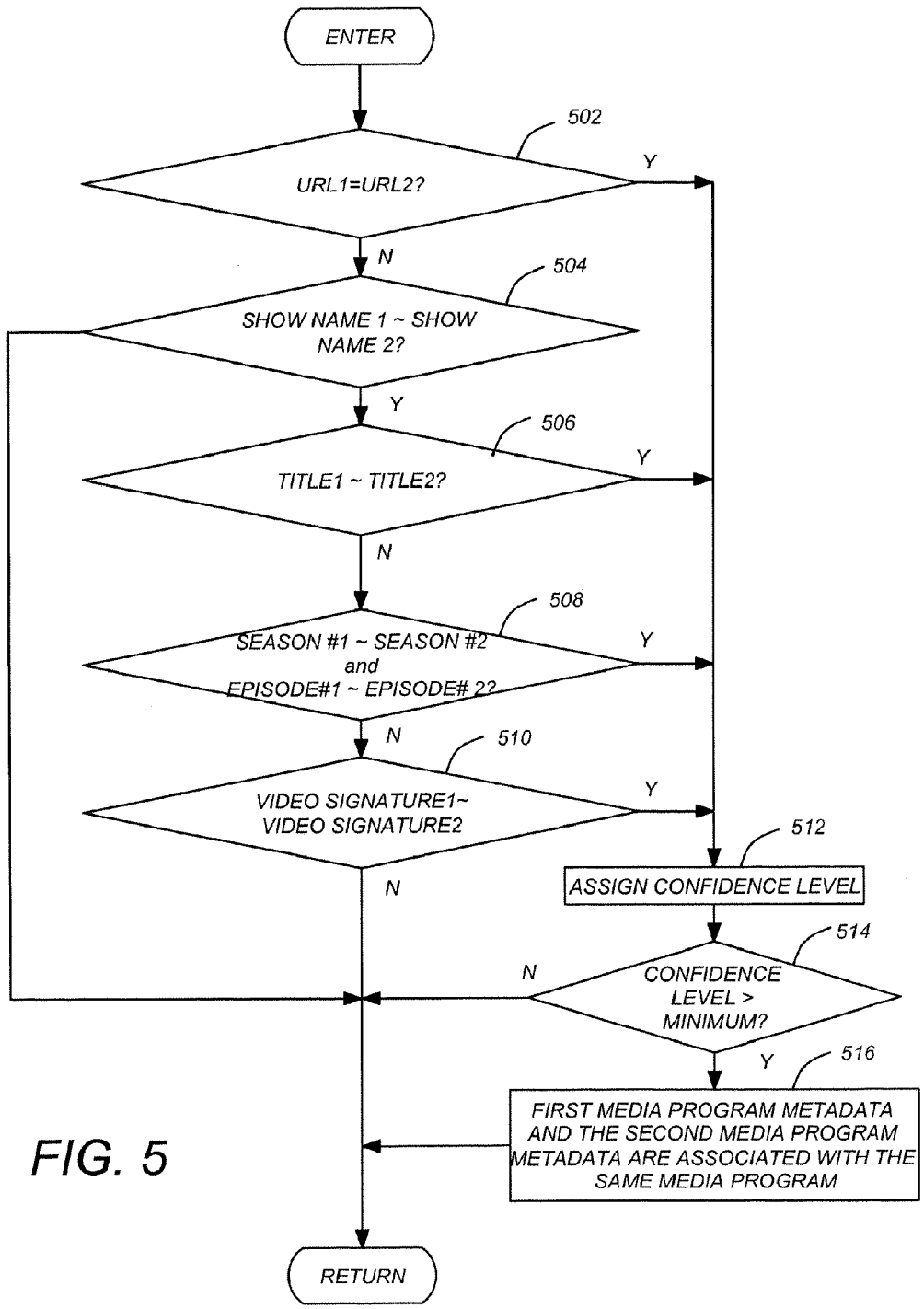
FIG. 5 is a flow chart showing exemplary process steps that can be used to determine whether the retrieved media program metadata is associated with the retrieved second media program metadata.

FIG. 5 is a flow chart showing exemplary process steps that can be used to determine whether the retrieved media program metadata 403 is associated with the retrieved second media program metadata 404. First, the URLs 410A and 410B of media program described by the first media program metadata 402 and the second media program metadata 404 are compared to see if they match, as shown in block 502. If they identically match, processing proceeds to block 512, where a high confidence level is assigned. Processing then proceeds to block 514 where it is determined whether the assigned confidence level exceeds a minimum. If the minimum confidence level is achieved, the first media program metadata and the second media program metadata are associated with the same media program (identified by the URL), and processing returns to FIG. 3.

If the URL 410A for the media program described by the first media program metadata 402 does not identically match the URL 410B for the media program described by the second media program metadata 404, processing proceeds to block 504, where the show name 412A of the first media program metadata 402 is compared to the show name 412B of the second media program metadata 404 are compared to determine if they match. In this case, (as indicated by the "~" in FIG. 5, "matching" does not require an identical match, rather, that the show names 412A and 412B are enough alike so that there is a high probability that they refer to the same show. In the illustrated example, both show names 412A and 412B are identical (ER), and so match. In other examples (e.g. MASH versus M*A*S*H), the show names match, although they are not identical.

If the show names match, processing proceeds to block 506, where a determination is made as to whether the titles 418A and 418B match. If the show names do not match, it is determined that the retrieved media program metadata 403 is not associated with the retrieved second media program metadata 404, and processing is passed to the return block.

As was true with the show names, the titles 418A and 418B need not identically match. If the titles 418A and 418B match, processing passes to block 512, where a confidence level is assigned. The confidence level can be determined by the degree to which the tiles 418A and 418B and show names 412A and 412B match (e.g. how many characters are common and how many are different). In one embodiment, the confidence level with a show name 412A and 412B and title 418A and 418B match is typically less than that of the URL from block 502. As before, the confidence level is compared to a minimum confidence level, and if the confidence level exceeds the minimum, the first media program metadata 402 and the second media program metadata are determined to be associated with the same media program, as shown in block 516.

If the show names match, but the titles do not, processing proceeds to block 508 where it is determined whether the season identifiers 414A and 414B and episode identifiers 416A and 416B match. If they match (and the show names match), processing proceeds to block 512 and further proceeds as described above.

If the URLs do not match, and the show names 412A and 412B and either the titles 418A and 418B or season 414A and 414B and episode identifiers 416A and 416B do not match, processing proceeds to block 510 where the video signatures of the first media program metadata 402 and the second media program metadata 404 are compared to determine if they match. Video signatures can include a variety of information including the video content, length, performer list 424A and 424B, and the synopsis 422A and 422B.

Note that in the example shown in FIG. 4A, the URLs do not match, however, the show name, title, season, and episode number all match. Further, the performer lists 424A and 424B substantially match, and the synopses 422A and 422B include many of the same keywords. Hence, a high confidence level will be assigned.

In one embodiment, the merging process comprises the steps of identifying media program metadata sets (e.g. 402 or 404) comprises the most complete version of the metadata associated with the identified program, and modifying that version by adding, subtracting or modifying that information based on analogous information from other received media program metadata associated with the same media program. Whether information is "analogous" or not can be determined in different ways. For example, analogous information can be determined from the labels associated with the metadata. For example, both the first media program metadata 402 and the second media program metadata 404 identify the season and episode number in the same way (under the categories "season" and "episode"). In this case, identifying the information provided by the second media program metadata 404 as duplicative is a matter of identically matching the categories and the data associated with the category. In other cases, the data labels are useful, but not dispositive in determining whether there are data duplications. For example, the first media program metadata uses the term "aired", while the second media program metadata uses the phrase "original air date" to refer to the same data. Since they both use the term "air", and both refer to dates (albeit in different forms), "aired" and "original air date" can be associated with the same data category. Once they become associated with the same data category, the values of the data in the data category (in the example, 1/15/1998 and Jan. 15, 1998) can be identified as duplicative, and only one of the entries adopted in the merged metadata.

In another embodiment, the merging process is accomplished by simply appending the second media program metadata to the first media program metadata, identifying and eliminating exact duplications, and identifying and eliminating probable duplications and errors, and adding additional information using the same techniques. Metadata errors can be identified in a number of ways. In one embodiment, the metadata is merged (and errors corrected) based upon a confidence level that is ascribed to the source of the metadata. For example, metadata from the original source of the media program (e.g. from the source the media program described by the metadata, such as www.abc.com) tends to have fewer errors than other non-original providers such as www.tv.com.

In the illustrated example, the first media program metadata 402 lists both performers and the characters they portray. However, it does not include one of the performers . . . namely, Noah Wyle. Second media program metadata 404 includes a longer and more detailed synopsis, but does not indicate which characters are portrayed by the performers. Using this technique a file is created as the union of all entries in the first media program metadata and the second media program metadata and duplicative entries are removed. Such duplicative entries would include, for example, the show name, season, episode, title, and all performers except Noah Wyle.

Figure 4B:
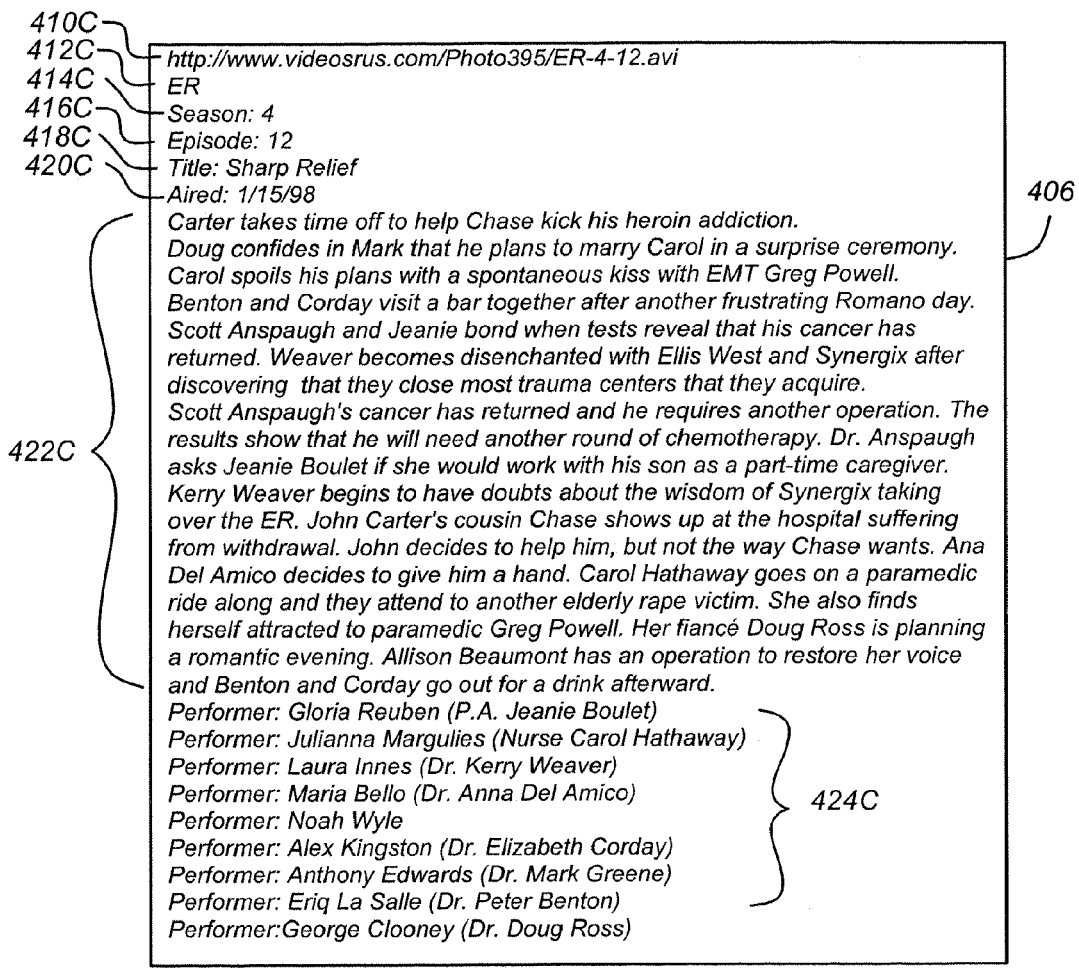
FIG. 4B is an illustration of an example of the merged metadata.

FIG. 4B is an illustration of an example of the merged metadata. Note that the synopsis 422C is the union of the synopsis 422A from the first media program metadata, and the synopsis 422B from the second media program metadata. Also note that the characters played by the performers is present, and that Noah Wyle (without the associated character) is also included.

Note also that performer Maria Bello was misspelled in the first media program metadata 402 and spelled properly in the second media program metadata 404 (the proper spelling is "Bello"). Since this data is not spelled precisely the same, but is simply one letter off, one of the two data values is regarded as an error. Which of the two data values is correct can be determined by further webcrawling and voting (the spelling with the most votes wins), or by ranking the source of the data and making the choice according to the ranking (one of the metadata sources may be more reliable than the other).

Figure 6:
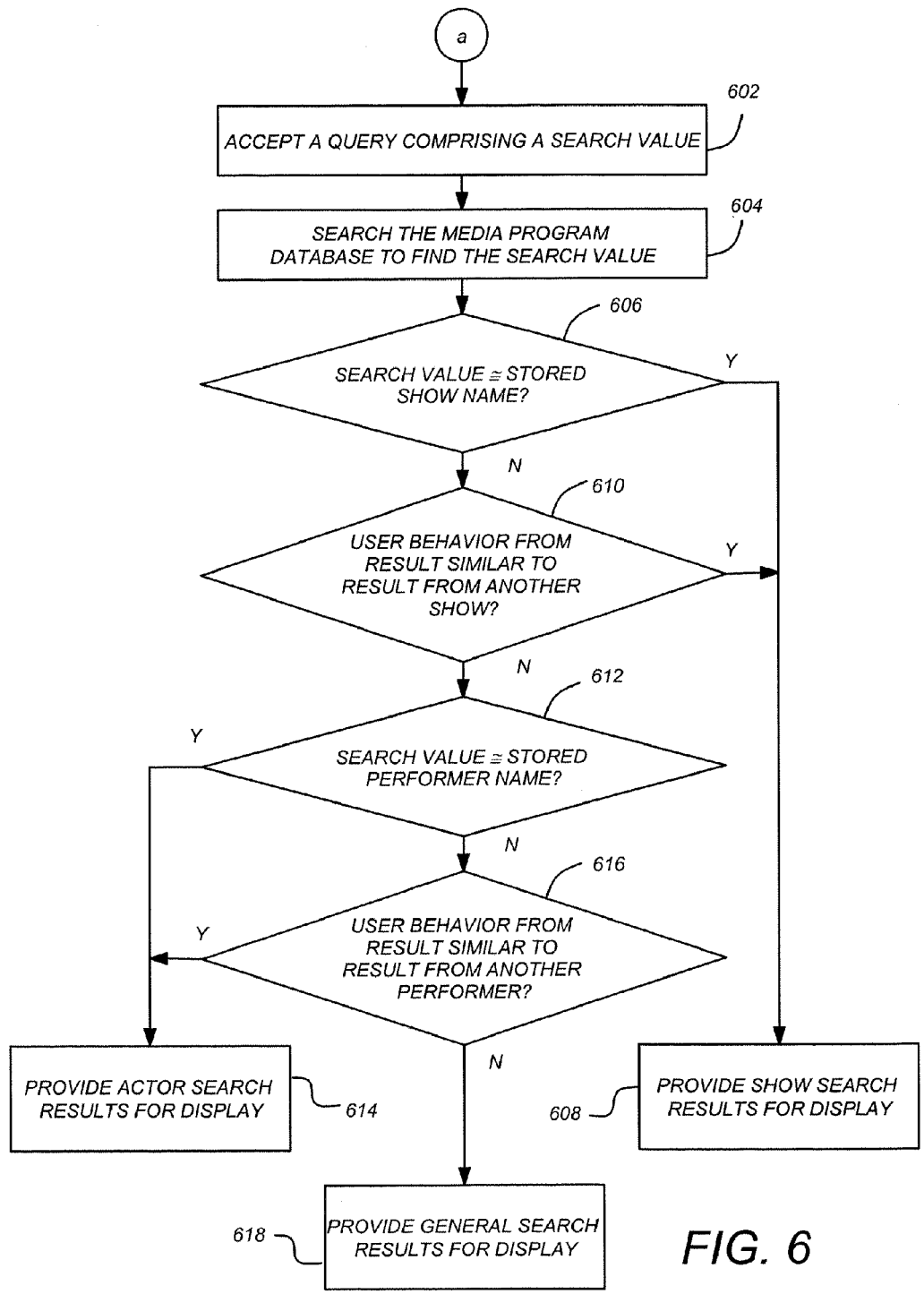
FIG. 6 is a diagram illustrating exemplary process steps describing a user search of the media program database.

FIG. 6 is a diagram illustrating exemplary process steps describing a user 132 search of the media program database. First, using the keyboard 214, pointing device 216 or other I/O device coupled to the computer 102, the user 132 enters a search value. In one embodiment, the search value is uncategorized. That is, the search value is entered into a single user interface and is not explicitly associated with any category of metadata. Hence, the user would enter performer names, keywords, titles, episode numbers and any other category of metadata into the same window without identifying which category the search value is associated with. In other embodiments, different search I/O features (e.g. separate text boxes for performers and show names) may be provided.

The computer transmits the search request to the media program provider 110 via the communications network 104. The media program provider 110 receives and accepts the query, as shown in block 602. Next, the media program database 114 is searched to find the search value, as shown in block 604.

If it is determined that the search value is correlated with a show name in the media program database 114, a first search result that lists media programs from the show identified by the show name (in the example, "ER") is returned for display on the user's computer 102. For instance, in the foregoing example, a listing of all ER media programs may be presented. Since there are a plurality of episodes, the result may be prioritized to present the results by season, and within each season by episode.

Correlation (indicated in FIG. 6 by "≅") does not require that the search value and the show name be identical. In one embodiment, whether a search value is correlated or not is determined by comparing the search value to a number of synonyms. Such synonyms can include, for example, all known abbreviation(s) for the search term(s). Correlation can also be performed by term or letter proximity, wherein the search value and the stored show name are determined to be correlated if they have the same letters or terms within a given number of letters or terms. In this way, for example, MASH can be identified as sufficiently correlated to M*A*S*H. If it is determined that the search value does not sufficiently correlated to any show name in the database 114, processing is passed to block 610, where it is determined whether previous user behavior indicates that the search value should be correlated to show name, even though the search value is not identical to or a known synonym of the stored show name, and correlation cannot be established by term proximity. This can be accomplished by identifying the search value and the show name as correlated if user-selected results from a previous search value correlate with user-selected results from the show name In one embodiment the system 100 keeps track of what results the user or users choose when performing a specific search queries, and identifying data as similar or correlated when user behavior for two different queries correlate.

For example, a user may enter a search query comprising the media program name "Sunny In Philly" on one occasion and enter a search query comprising the media program name "It's Always Sunny in Philadelphia," on another occasion, resulting in different search results. If that same user selects the same media programs from both search results, it is inferred that "Sunny in Philly" and "It's Always Sunny in Philadelphia" refer to the same media program. Hence, specific user behavior (evidenced by the user's clickstream or hotlink selections) can be stored. Preferably, user behavior data is stored in the media program database 114, but may be stored in the user's computer 102 in addition or in the alternative. The user behavior data is used to determine whether future search values are synonyms to those already known.

This technique can be used to aggregate user behavior across a plurality of users as well. This can be accomplished by storing the search terms or phrases that were entered by system users 132. The system 100 then provides the search results, which includes a listing of media programs having metadata correlating with the search terms or phrases, with each media program listing preferably including a hotlink to the associated media program. The media program provider 110 keeps track of which of the hotlinks users select and associates those hotlinks with the search terms or phrases that were entered. If the set of hotlinks selected by users who entered a first search phrase and the set hotlinks selected by users who entered a second search phrase have a sufficient number of common hotlinks, the media program provider can deem the user behavior to be similar, and pass processing to block 608. In the example illustrated above, supposing the media program database 114 includes the show name "It's Always Sunny in Philadelphia" but not "Sunny in Philly." In this case, the search value may not be correlated with a show name stored in the database, but if user-selected results from previous search values correlate with the user-selected results from the show name, block 610 will direct processing to block 608. The foregoing user behavior may also be used to update the list of synonyms considered in the processing of block 606.

If the search value is not correlated to a stored show name and the user selected results from a previous search value do not correlate with the user selected results from the show name, processing is routed to block 612, wherein a determination is made as to whether the search value is correlated to a performer's name stored in the program database. This can be accomplished using the techniques described with respect to blocks 606 above. If the search value correlates with a performer name stored in the media program database 114, processing is passed to block 614, which returns a second search result comprising a listing of only media programs associated with the search performer name. In one embodiment, the second search result presents media programs in which the performer plays a role, ranked by video quality and popularity.

If the search value does not correlate with a performer name stored in the media program database, processing is passed to block 616, which determines if user-selected results from a previous search value correlate with user-selected results from the performer name. This can be accomplished as described above in block 610. If the user selected results from a previous search value correlate with the user selected results for the entered performer name, processing proceeds to block 614. If user-selected results from a previous search value do not correlate with user-selected results from the performer name, processing is passed to block 618, and a third search result is provided which comprises a list of media programs having metadata correlating with the search value, ranked by relevance. Hence, the logic above determines whether the search value is likely correlated to a media program (and if so, provides a listing of media programs), determines if the search value is likely correlated to a performer (and if so, provides a listing of media programs in which the performer is included), and if neither search value is not likely correlated to either a media program or a performer, returns a general search result ranked by relevance.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of generating a media program database having a plurality of media programs, comprising:
   receiving first media program metadata from a first source;
   receiving second media program metadata from a second source distinct from the first source;

comparing one or more sections in a first set of sections of the first media program metadata with one or more sections in a second set of sections of the second media program metadata;

assigning a level indicating a confidence that the first media program metadata and the second media program metadata are associated with a same media program based on the comparing, wherein matches in different sections are weighted differently to determine the level;

determining the first media program metadata and the second media program metadata are associated with the same media program and the first media program metadata and the second media program metadata can be merged if the level is above a threshold;

merging the first media program metadata and the second media program metadata if the first media program metadata and the second media program metadata are associated with the same media program; and storing the merged first media program metadata and second media program metadata in the media program database.

2. The method of claim 1, wherein receiving first media program metadata from the first source comprises receiving a media program and the first media program metadata from a media program provider.

3. The method of claim 1, wherein:
receiving the first media program metadata from the first source comprises webcrawling the Internet to find the first media program metadata from the first source; and
receiving the second media program metadata from the second source distinct from the first source comprises webcrawling the Internet to find second media program metadata from the second source.

4. The method of claim 1, wherein the second source has a different domain name than the first source.

5. The method of claim 1, further comprising purging the first media program metadata and the second media program metadata to normalize titles.

6. The method of claim 1, wherein comparing comprises:
determining if the first media program metadata and the second media program metadata are associated with a media program at a same uniform resource locator (URL).

7. The method of claim 6, wherein:
the first set of sections include first show name data and first title data and the second set of sections include second show name data and second title data; and
comparing comprises:
determining if the first show name data matches the second show name data;
determining if the first title data matches the second title data; and
determining that the first media program metadata and the second media program metadata are associated with the same media program if the first show name data matches the second show name data and the first title data matches the second title data.

8. The method of claim 7, wherein:
the first set of sections include first show name data, first season data and first episode data and the second set of sections include second show name data, second season data and second episode data; and
comparing comprises:
determining if the first show name data matches the second show name data;
determining if the first season data matches the second season data and the first episode data matches the second episode data; and
determining that the first media program metadata and the second media program metadata are associated with the same media program if the first show name data matches the second show name data and the first season data matches the second season data and the first episode data matches the second episode data.

9. The method of claim 8, wherein:
the first set of sections include includes first show name data and first video signature data and the second set of sections include includes second show name data and second video signature data; and
comparing comprises:
determining if the first show name data matches the second show name data;
determining if the first video signature data matches the second video signature data; and
determining that the first media program metadata data and the second media program metadata are associated with the same media program if the first show name data matches the second show name data and the first video signature data matches the second video signature data.

10. The method of claim 1, wherein:
the merged first media program metadata and second media program metadata comprises a show name and a performer name; and
the method further comprises:
accepting a search request from a user, the search request comprising a search value;
searching the media program database for a database parameter having the search value;
determining if the search value is correlated to a show name stored in the media program database;
if the search value is correlated to the show name stored in the media program database, returning a first search result comprising only media programs associated with the show name;
if the search value is not correlated to a show name, determining if the search value is correlated to a performer name stored in the media program database;
if the search value is correlated to a performer name stored in the media program database, returning a second search result comprising only media programs associated with the performer name; and
if the search value is not correlated with the show name and not correlated with the performer, returning a third search result comprising all media programs associated with the search value.

11. The method of claim 10, wherein:
determining if the search value is correlated to a show name stored in the program database is performed by term proximity or abbreviation; and
determining if the search value is correlated to a performer name stored in the program database is performed by term proximity or abbreviation.

12. The method of claim 10, wherein:
determining if the search value is correlated to a show name stored in the program database comprises identifying the search value and the show name as correlated if user-selected results from a previous search value correlate with user-selected results from the show name; and
determining if the search value is correlated to a performer stored in the program database comprises identifying the search value and the performer name as correlated if user-selected results from a previous search value correlate with user-selected results from the performer name.

13. The method of claim 10, wherein:
the merged first and second media program metadata comprises a show name, season and episode, a video quality and popularity;
the returned first search result is ordered by season and episode number; and
the returned second search result is ordered by video quality and popularity.

14. The method of claim 1, wherein:
comparing comprises:
comparing sections in the first set of sections and the second set of sections to determine a match of a section to end the comparing of the sections; and
assigning the level based on which section was determined to match and a quality of the match.

15. The method of claim 14, wherein:
sections in the first set of sections and the second set of sections include a show name, a title, season information, episode information, and a video signature, and
comparing comprises comparing at least a portion of the show name, the title, the season information, the episode information, and the video signature until a match indicating the first media program metadata and the second media program metadata are associated with the same media program is determined.

16. The method of claim 14, wherein:
sections in the first set of sections and the second set of sections include a plurality of different sections that are compared in a determined order, and
wherein the level assigned depends on which section in the plurality of different sections is determined to match.

17. The method of claim 1, wherein:
sections in the first set of sections and the second set of sections include a show name, a title, season information, episode information, and a video signature, and
comparing comprises comparing at least a portion of the show name, the title, the season information, the episode information, and the video signature until a match indicating the first media program metadata and the second media program metadata are associated with the same media program is determined.

18. The method of claim 1, wherein:
sections in the first set of sections and the second set of sections include a plurality of different sections that are compared in a determined order, and
wherein the level assigned depends on which section in the plurality of different sections is determined to match.

19. An apparatus configured to generate a media program database having a plurality of media programs, the apparatus comprising:
one or more computer processors; and
a computer-readable storage medium comprising instructions for controlling the one or more computer processors to be operable to:
receive first media program metadata from a first source;
receive second media program metadata from a second source distinct from the first source;
compare one or more sections in a first set of sections of the first media program metadata with one or more sections in a second set of sections of the second media program metadata, wherein matches in different sections are weighted differently to determine the level;
assign a level indicating a confidence that the first media program metadata and the second media program metadata are associated with a same media program based on the comparison;
determine the first media program metadata and the second media program metadata are associated with the same media program and the first media program metadata and the second media program metadata can be merged if the level is above a threshold;
merge the first media program metadata and the second media program metadata if the first media program metadata and the second media program metadata are associated with the same media program; and
store the merged first media program metadata and second media program metadata in the media program database.

20. The apparatus of claim 19, wherein receive first media program metadata from the first source comprises receive a media program and the first media program metadata from a media program provider.

21. The apparatus of claim 19, wherein:
receive the first media program metadata from the first source comprises webcrawling the Internet to find first media program metadata from the first source; and
receive the second media program metadata from the second source distinct from the first source comprises webcrawling the Internet to find second media program metadata from the second source.

22. The apparatus of claim 19, wherein the second source has a different domain name than the first source.

23. The apparatus of claim 19, further comprising purge the first media program metadata and the second media program metadata to normalize titles.

24. The apparatus of claim 19, wherein compare comprises:
determine if the first media program metadata and the second media program metadata are associated with a media program at a same uniform resource locator (URL).

25. The apparatus of claim 24, wherein:
the first set of sections include first show name data and first title data and the second set of sections include second show name data and second title data; and
compare comprises:
determine if the first show name data matches the second show name data;
determine if the first title data matches the second title data; and
determine that the first media program metadata and the second media program metadata are associated with the same media program if the first show name data matches the second show name data and the first title data matches the second title data.

26. The apparatus of claim 25, wherein:
the first set of sections include first show name data, first season data and first episode data and the second set of sections include second show name data, second season data and second episode data; and
compare comprises:
determine if the first show name data matches the second show name data;
determine if the first season data matches the second season data and the first episode data matches the second episode data; and
determine that the first media program metadata and the second media program metadata are associated with the same media program if the first show name data matches the second show name data and the first season data matches the second season data and the first episode data matches the second episode data.

27. The apparatus of claim 26, wherein:
the first set of sections include first show name data and first video signature data and the second set of sections include second show name data and second video signature data; and
compare comprises:
  determine if the first show name data matches the second show name data;
  determine if the first video signature data matches the second video signature data; and
  determine that the first media program metadata and the second media program metadata are associated with the same media program if the first show name data matches the second show name data and the first video signature data matches the second video signature data.

28. The apparatus of claim 19, wherein:
the merged first media program metadata and second media program metadata comprises a show name and a performer name; and
the apparatus further comprises:
  accept a search request from a user, the search request comprising a search value;
  search the media program database for a database parameter having the search value;
  determine if the search value is correlated to a show name stored in the media program database;
  return a first search result comprising only media programs associated with the show name if the search value is correlated to the show name stored in the media program database;
  determine if the search value is correlated to a performer name stored in the media program database if the search value is not correlated to a show name;
  return a second search result comprising only media programs associated with the performer name if the search value is correlated to a performer name stored in the media program database; and
  return a third search result comprising all media programs associated with the search value if the search value is not correlated with the show name and not correlated with the performer.

29. The apparatus of claim 28, wherein:
determine if the search value is correlated to a show name stored in the program database comprises determine term proximity or abbreviation; and
determine if the search value is correlated to a performer name stored in the program database comprises determine term proximity or abbreviation.

30. The apparatus of claim 28, wherein:
determine if the search value is correlated to a show name stored in the program database comprises identify the search value and the show name as correlated if user-selected results from a previous search value correlate with user-selected results from the show name; and
determine if the search value is correlated to a performer stored in the program database comprises identify the search value and the performer name as correlated if user-selected results from a previous search value correlate with user-selected results from the performer name.

31. The apparatus of claim 28, wherein:
the merged first and second media program metadata comprises a show name, season and episode, a video quality and popularity;
the returned first search result ordered by season and episode number; and
the returned second search result is ordered by video quality and popularity.

32. The apparatus of claim 19, wherein:
compare comprises:
compare sections in the first set of sections and the second set of sections to determine a match of a section to end the comparing of the sections; and
assign the level based on which section was determined to match and a quality of the match.

33. A non-transitory computer-readable storage medium containing instructions for generating a media program database having a plurality of media programs, the instructions for controlling a computer system to be operable to:
  receive first media program metadata from a first source;
  search the Internet to find second media program metadata from a second source distinct from the first source;
  compare one or more sections in a first set of sections of the first media program metadata with one or more sections in a second set of sections of the second media program metadata;
  assign a level indicating a confidence that the first media program metadata and the second media program metadata are associated with a same media program based on the comparison, wherein matches in different sections are weighted differently to determine the level;
  determine the first media program metadata and the second media program metadata are associated with the same media program and the first media program metadata and the second media program metadata can be merged if the level is above a threshold;
  merge the first media program metadata and the second media program metadata if the first media program metadata and the second media program metadata are associated with the same media program; and
  store the merged first media program metadata and second media program metadata in the media program database.

* * * * *